United States Patent [19]

Holcombe, Jr.

[11] 4,113,686

[45] Sep. 12, 1978

[54] HYDROPHILIC CONTACT LENSES AND LENS POLYMER

[75] Inventor: Frank O. Holcombe, Jr., Beltsville, Md.

[73] Assignee: Burton, Parsons and Company, Inc., Washington, D.C.

[21] Appl. No.: 805,146

[22] Filed: Jun. 9, 1977

[51] Int. Cl.² .................. C08F 4/36; C08F 120/06; C08F 20/06; C08L 33/02

[52] U.S. Cl. .................. 260/29.6 TA; 264/1; 526/232.3; 526/317

[58] Field of Search .............. 526/317, 227, 232.3; 260/29.6 TA; 264/1

[56] References Cited

U.S. PATENT DOCUMENTS

| | | | |
|---|---|---|---|
| 3,850,892 | 11/1974 | Shen et al. | 526/317 |
| 3,926,892 | 12/1975 | Holcombe | 260/29.6 TA |
| 3,937,680 | 2/1976 | Carle | 260/29.6 TA |
| 3,944,637 | 3/1976 | Bond et al. | 526/317 |
| 3,948,841 | 4/1976 | Dusek | 260/29.6 TA |
| 3,965,063 | 6/1976 | Holcombe | 260/29.6 TA |
| 3,983,083 | 9/1976 | Kaetsu et al. | 526/317 |
| 3,985,697 | 10/1976 | Urbach | 264/1 |
| 3,988,274 | 10/1976 | Masuhara et al. | 264/1 |

Primary Examiner—Herbert J. Lilling
Attorney, Agent, or Firm—Fidelman, Wolffe & Waldron

[57] ABSTRACT

A superior hydrophilic gel polymer and contact lenses therefrom are formed by bulk polymerization of about 100 parts by volume of hydroxyethyl methacrylate, 10 parts by volume of isobutyl methacrylate, 0.136 parts by volume of trimethylolpropane trimethacrylate, 1.35 parts by volume of methacrylic acid in the presence of 0.25 parts by volume of 2,5 dimethyl 2,5 bis (2-ethyl hexoyl peroxy) hexane at a temperature of about 65° C to produce a material which, when hydrated, exhibits a water content of about 43% and a linear expansion of about 22%.

3 Claims, No Drawings

HYDROPHILIC CONTACT LENSES AND LENS POLYMER

This application relates to hydrophillic gel polymers and hydrophilic gel polymer lenses. More particularly, it relates to contact lenses of the so-called "soft" type. Still more particularly, it relates to hydrophilic gel polymer contact lenses having improved physical and mechanical properties. More particularly yet, the present invention relates to a novel hydrophilic gel polymer having exceptional physical and mechanical properties offering substantial advantages in the manufacture of contact lenses and to hydrophilic gel polymer contact lenses formed therefrom having superior physical and mechanical properties.

Hydrophilic gel polymers and contact lenses of such polymers are now well known in the art and are finding ever wider use and acceptance. Such polymers and their employment are taught, for example, in U.S. Pat. No. 2,976,576 and in U.S. Pat. No. Re. 27,401. The polymers therein disclosed and claimed are cross-linked, three dimensional gel latices resulting from the addition polymerization, normally, of hydroxyethyl methacrylate and a minor amount of ethylene glycol dimethacrylate. The polymers thus formed are hydrophilic and are swelled by, but insoluble, in water. When fully hydrated, depending upon the degree of cross-linking, they contain 20 to 97 weight percent water, and swell to an extent which is a variable of the water content. When hydrated, the polymer is soft, pliable, and optically clear and, normally, colorless.

Because of the combination of properties of such hydrated gel polymers, they have been found useful in the manufacture of contact lenses and offer characteristics not before obtainable.

There have been, however, some difficulties presented by the hydrophilic gel polymer lenses. They are far more difficult to manufacture then the more conventional hard plastic lenses, usually made of poly(methyl methacrylate). The gel polymers require formation in lens blank form usually by centrifugal casting of the bulk polymerization mix. As a consequence, production is slow and expensive in both time and equipment. In addition, the blank must be closely conformed to the ultimate lens shape in unhydrated form since the polymer is not easy to precisely machine to lens tolerances. In another aspect, it has been difficult to control the hydration characteristics of the polymer so that expansion is predictable and reproducible within the necessary close tolerances. In yet another context, it has proved impractical to obtain some lens shapes by the required techniques; and thus, some ocular debilities have not been susceptible to correction with the gel lenses. An example, astigmatism has not successfully been corrected with the gel lenses. Even at best, tolerances are difficult to maintain with the desired precision; and very often, visual acuity is not as good as can readily be obtained with hard lenses. The gel lenses are also somewhat fragile with a tendency to fray and a susceptibility to abrasion damage.

It is accordingly an object of the present invention to provide a novel hydrophilic gel polymer which is not subject to the foregoing disadvantages, which is easily and precisely machinable to close tolerances, which has a predictable and reproducible degree of hydration and expansion upon swelling, and which can be formed into complex shapes with precision. Another object is the provision of hydrophilic gel lenses from such polymers having physical and mechanical properties superior to prior gel lenses. These and still other objects are attained, as will be clear from the present disclosure, by addition polymerizing in bulk a monomer mixture of a major proportion of hydroxyethyl methacrylate and minor proportions of the following comonomers: i-butyl methacrylate and trimethylolpropane trimethacrylate as a cross-linking monomer. The monomer mixture is addition polymerized in bulk, i.e., in the absence of solvents or suspending or emulsifying media by techniques known per se and common in the art. Such techniques require no instruction to those of ordinary skill in the art and form no part of the present invention. As is familiar to those of ordinary skill, such polymerization may be effected with per-compounds, e.g., peroxides. A preferred catalyst species for the polymerization of the present invention is 2,5 dimethyl-2,5 bis(2 ethyl hexoyl peroxy) hexane available from the Witco Chemical Company under the trademark "USP 245".

The characteristics which render the peroxy compound particularly suitable as a catalyst for this reaction are (1) in the course of the reaction, it breaks down into innocuous materials; (2) it is usable at the temperature and condition of the polymerization reaction; and (3) it is a liquid which is miscible with the other starting compounds.

The addition polymer of the present invention, in its dry and unhydrated state, is a tough, resilient solid readily machinable to substantially and desired shape with quite precise tolerances. When hydrated, full hydration results in the absorption of about 43 weight percent water, based on the weight of the polymer, and a linear expansion of about 22 percent greater than the dry material. The hydrated gel is fully clear and colorless and is a tough and resilient material, elastically but not plastically deformable. The gel is non-toxic and biologically and physiologically tolerable. By virtue of these characteristics, contact lenses of exceptional superior properties are formed with exceptional ease, without the attendant problems and disadvantages heretofore encountered.

Hydroxyethyl methacrylate is, of course, a well known and even familiar compound to those of ordinary skill. It is a freely available article of commerce. In the present disclosure, the hydroxyethyl methacrylate employed was the material sold as "Hema," by Rohm and Haas, and was employed after distillation of the commercial form as received. As noted above, the hydroxyethyl methacrylate will be the predominant monomer in the polymerization mix on the order of about 100 parts by volume.

The iso-butyl methacrylate employed as one comonomer in the present invention is also a known, commercially available material. In the present disclosure, the material employed is that sold by Polysciences, Incorporated, and was employed as received. The iso-butyl methacrylate is a minor constituent in proportion in the polymerization mix, generally being employed at about 10 parts by volume.

Another common, commercially and readily available comonomer employed in the formation of the polymer of the present invention is methacrylic acid employed in about 1.35 parts by volume.

The cross-linking monomer of the polymer of the present invention is trimethylolpropane trimethacrylate. The commercially available material employed in the present disclosure is sold under the trademark "SR 350" by Sartomer Company and is filtered through activated carbon before use. The cross-linking monomer is included in the polymerization mix in proportions of about 0.136 parts by volume.

The foregoing monomers are mutually soluble in one another and form a homogenous solution which is readily handled. In the preparation of the polymer of the present invention, the monomers are combined, usually in an appropriate polymerization reaction vessel and the catalyst is added, dissolved in the monomers which are then mixed to distribute the catalyst uniformly and polymerization reaction then proceeds. As noted above, the preferred catalyst is 2,5 dimethyl 2,5 bis(2-ethyl hexoyl peroxy) hexane. When this preferred catalyst species is employed, it will generally be present in amounts of about 0.25 parts by volume.

As already mentioned, polymerization process parameters are not critical and will generally be chosen on the basis of convenience, availability of equipment, and consistency with the particular catalyst, 2,5 dimethyl 2,5 bis(2-ethyl hexoyl peroxy) hexane, such conditions may conveniently, if desired, include the provision of an inert atmosphere, such as nitrogen, at a somewhat elevated pressure, say about one atmosphere above ambient and at a temperature of 65° C. The polymerization is generally carried to completion, over about 2 to 12 hours for example.

Polymerization may be conducted in molds conformed to a basic lens blank shape or in the form of rods or the like which are thereafter cut into lens blanks. Because of the ready and reliable machinability of the polymer, there is no need to employ difficult and exacting techniques such as the centrifugal casting polymerization techniques often employed; although if desired, these procedures too many be employed.

The polymer is in any eventuality formed by convenient techniques into lens blanks of appropriate dimensions, and then machined and polished to appropriate specifications into lens shapes, allowing for the expansion which takes place upon hydration of the polymer. Machining and polishing take place conveniently by the familiar techniques common to the manufacture of hard, i.e., polymethyl methacrylate, contact lenses.

The linear expansion of the polymer and lenses, prepared in accordance with the present invention, is extremely uniform and reproducible. The water content of the polymer and lenses formed therefrom at full hydration is about 43 weight percent. The linear degree of expansion from dry to fully hydrated is about 22 percent, based on dry dimensions.

The ease of machinability and polishing and the highly predictable and reproducible large expansion characteristics of the polymer make possible the attainment of far closer tolerances and far greater compliance with a prescription than has generally been possible with hydrophilic gel polymer lenses, resulting in substantially better correction of visual defects and higher visual acuity for the user. These same characteristics make possible the realistic and practical attainment of complex shapes, expanding the visual problems amenable to correction with the hydrophilic gel polymer lenses.

Once the prescribed lens is formed, allowing for expansion, the lens polymer is hydrated before use. While water may be used, it is distinctly preferred to employ an aqueous saline solution, isotonic with the eye and buffered to an appropriate pH, most often in the range of about 6.8 to 7.4.

Full hydration may be attained in a little as about 2 hours; although it is ordinarily preferred to allow a larger period to ensure full hydration. If convenient, it is generally preferred to allow the lenses to soak say overnight or for a like period in a substantial excess of the hydrating medium. Once hydrated, it is preferred that the lens be maintained in this condition, with periodic soaking in an appropriate hydrating and soaking medium. Since the usual practice is to require the user to remove the lenses overnight, this period affords a safe and effective period for maintenance of hydration. The high water content of the hydrated polymer is especially desirable.

The preparation of the polymer of the present invention is illustrated in the following specific examples and also shown is the formation of the polymer into contact lenses according to the present invention. It is intended to show the best mode of practicing the invention contemplated for the guidance of those of ordinary skill in the art but not to limit or define the scope of the invention. Given the guidance of the present disclosure, those skilled in the art will understand that there are many variations which can be made in known fashion.

EXAMPLE

A bulk polymerization mix is formed of the following in parts by volume:
hydroxyethyl methacrylate: 100
iso-butyl methacrylate: 10
trimethylolpropane: 0.136
methacrylic acid: 1.35

The monomer mixture is stirred thoroughly to a homogenous solution and 0.25 parts by volume is added with continued stirring for about 15–30 minutes.

The polymerization mix, thus formed, is poured into a plurality of molds of a shape approximating a lens or a lens blank. The molds are fitted with a cover which is evacuated to about 24 inches (water) and then pressurized with nitrogen gas to about one atmosphere above ambient pressure. The sealed molds are then heated to a temperature of about 65° C and held at for about 3 to 4 hours.

The molds are then cooled and opened; and a plurality of lens blanks are obtained. Upon examination, the lens blanks are found to be tough and resilient and have a transparent, colorless appearance.

The blanks were then machined into contact lenses on a conventional hard lens lathe. The machined surfaces were examined under magnification and were found to be substantially free of pits, gouges, rough areas, and the like having a substantially uniform appearance requiring little polishing. Measurement revealed close conformation to design tolerances and specifications based on predicted 22% linear expansion upon hydration.

The lenses were then polished to fine optical surfaces and were then hydrated to soaking for 8 hours in isotonic saline. The hydrated lenses were remeasured and found to conform to prescribed specifications within quite good tolerances.

The lenses were delivered to users for whom they had been prescribed and were worn over a period of 6 weeks in a normal fashion for gel lenses with no problems.

What is claimed is:

1. A hydrophilic gel polymer consisting of the addition copolymer of about the following in parts of volume:

2-hydroxethyl methacrylate — 100 parts
isobutyl methacrylate — 10 parts
trimethylolpropane trimethyacrylate — 0.136 parts
methacrylic acid — 1.35 parts
2,5 dimethyl 2,5 bis(2-ethyl hexoyl peroxy) hexane — 0.25 parts.

2. A hydrophilic gel polymer contact lens comprising a hydrated gel of the polymer of claim 1 containing about 43 weight percent water.

3. The lens of claim 2 wherein said polymer is machined and polished to a hydratable lens form allowing for about 22 percent linear expansion and thereafter hydrated to contain about 43 weight percent water.